United States Patent Office 3,427,527
Patented Feb. 11, 1969

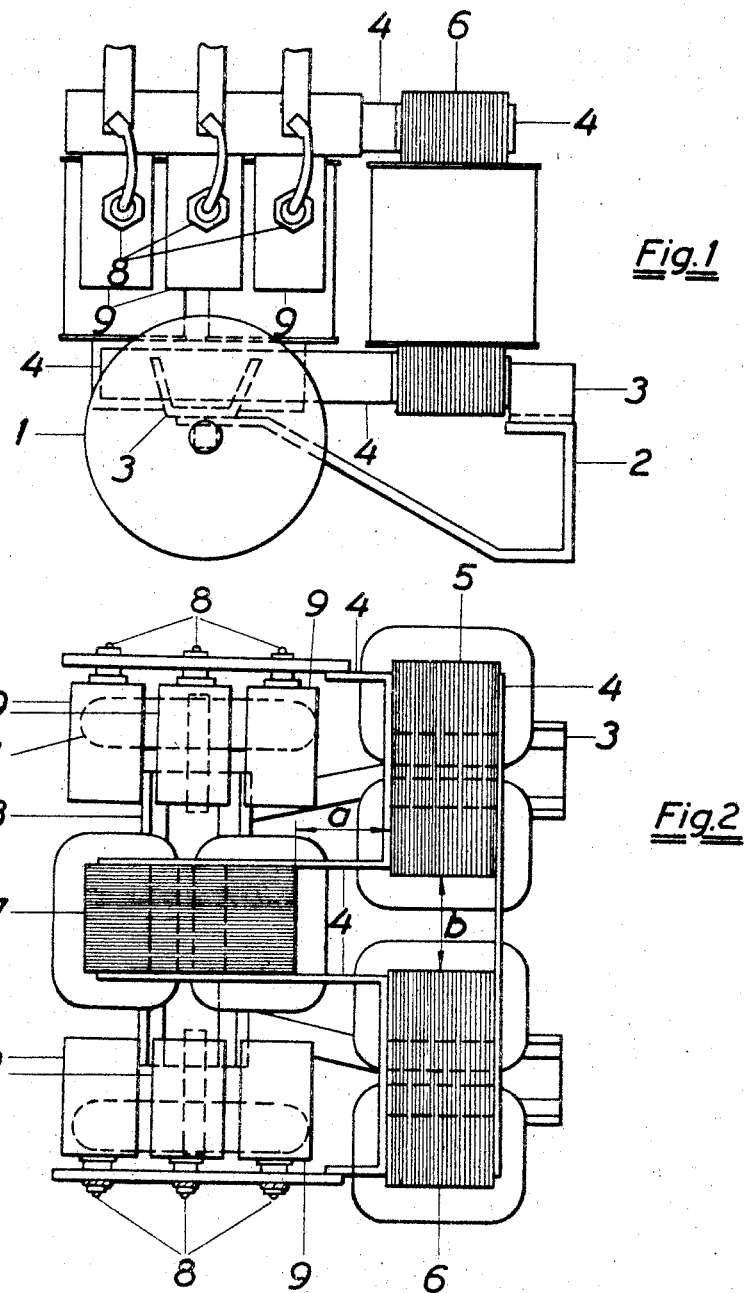

3,427,527
THREE-PHASE WELDING TRANSFORMER
Frede Christensen, Christian Johannes Henningsen, Bernt Arne Rudolf Larson, Karl-Erik Knipström, and Björn Frost Skarpengland, Laxa, Sweden, assignors to Elektriska Svetsningsaktiebolaget, Goteborg, Sweden, a corporation of Sweden
Filed Feb. 27, 1967, Ser. No. 618,624
Claims priority, application Sweden, Mar. 7, 1966, 2,928/66
U.S. Cl. 321—8                7 Claims
Int. Cl. H02m 7/00; H01f 33/00; B23k 9/10

ABSTRACT OF THE DISCLOSURE

A three-phase welding transformer composed of three individual single-phase core transformers possessing substantial stray reactance. The three transformers are disposed as a group satisfying the following conditions:

The legs of all of the transformers are parallel with each other;

The transformer cores are confined between two parallel planes which extend at right angles to the leg axes, the distance between said planes being equal to the total height of a core in the axial direction of the legs;

The symmetry planes of two cores are parallel and form right angles with the symmetry plane of the third core;

The distance between the parallel cores is approximately equal to the distance between either of them and the third core;

The distance between any two of the cores does not exceed 0.75 times the yoke length of the cores.

---

This invention relates to a three-phase welding transformer of the type comprising three individual, identically similar single-phase transformers comprising each a core, a primary winding and a secondary winding, said core having parallel legs connected at their extremities by yoke members, said primary and secondary windings being so disposed on said legs as to provide a substantial stray reactance of each of said individual transformers.

For several reasons, it is desirable that the three-phase transformer offers a symmetrical load to the network. Even if the loads fed by the single-phase transformers are duly equalized, the stray fields tend, however, to cause a departure from the symmetrical state at the input terminals of the three-phase transformer, as part of the stray flux issuing from one transformer will pass through the windings of one or both of the other transformers. On the other hand, obvious practical reasons render it desirable to dispose the three individual transformers so as to form a compact group.

The invention has for its principal purpose to provide a three-phase welding transformer of the type above specified which combines a compact design of the transformer as a whole with the provision of a symmetrical, or approximately symmetrical, load on the three phase network (or other source of power) feeding the welding transformer.

According to a principal feature of the invention, the three transformer cores are confined between a pair of common, parallel planes extending at right angles to the legs of the cores, the spacing of said parallel planes being equal to the total height of each core in the direction defined by the axes of the legs, the symmetry plane of a first one of said cores, as defined by the axes of the legs of said core, being parallel to the symmetry plane of a second one of said cores and forming right angles with the symmetry plane of the third core, said first and second cores being spaced by substantially the same distance from said third core, said distance being at least approximately equal to the one separating said first and second cores, neither of the distances between any two of the cores exceeding 0.75 times the yoke length of the cores. Preferably, said last mentioned distances should not exceed 0.50 times the yoke length of the cores. The expression "yoke length" should be understood to mean the total width of the core in the direction of the axis of the yoke. The provision that the symmetry planes of two of the cores are parallel should be understood to include the case that said symmetry planes are coinciding, that is, that the cores in question have a common symmetry plane.

In practice, the proper relative positions of three leakage transformers of the same size and type, may, for instance, be arrived at in the following manner. First, two of the transformers are arranged on a common support in such a way that the symmetry planes of the cores are parallel and that the cores are separated by a gap having a given or suitably chosen width not exceeding the amount above specified. Next, the position of the third core, the symmetry plane of which forms right angles with the symmetry planes of the other two cores, is adjusted until a symmetrical load is presented to the source of power (the network). The distances of the third core to each of the two other cores are to be kept equal throughout the tests. As a rule, the distance required for symmetrical load conditions will be found to be substantially equal to the distance between the two parallel cores, or to differ from said distance by less than 20%. In many cases, it will therefore be possible to obtain a satisfactory degree of symmetry by just making the distance from the third core to each of the two parallel cores equal to the distance between the parallel cores.

The invention is not limited to any particular design of the individual leakage transformers. Said transformers may, for instance, be provided with a magnetic shunt the reluctance of which is adjustable by means of D.C. excited saturation winding or by means of a mechanically movable member. In a preferred embodiment of the invention, the cores of the individual transformers have two legs one of which carries the secondary winding and a first part of the primary winding of the transformer while the other leg carries a second part of the primary winding, both of said parts being provided with taps, switching means being provided for selectably engaging said taps for adjustment of the ratio of the number of turns connected in circuit in said first part to the number of turns connected in circuit in said second part of the primary winding. This arrangement permits adjustment of the magnetic leakage, or the stray inductance, within wide limits without disturbing the symmetry of the load presented to the network.

By way of example reference will now be made to the accompanying drawings, in which:

FIG. 1 is an elevational view of a transportable welding rectifier provided with a transformer unit according to the invention;

FIG. 2 is a plan view of the unit shown in FIG. 1;

Figure 4:
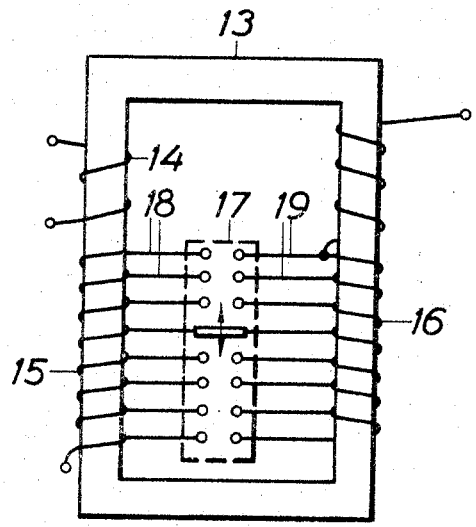

FIG. 4 schematically illustrates a preferred design of the single-phase leakage transformers of which the transformer unit according to the invention is composed.

In FIGS. 1 and 2, such details as are not necessary to the understanding of the invention, such as the welding current adjusting means, the pole reversing switch, the cooling fan and the casing, have been omitted for better clarity. The rectifier unit shown is supported by a chassis 3 provided with a pair of wheels 1 and a pair of legs 2. The transformer cores 5, 6, 7 are attached to frame members 4 so as to form a T-shaped group the cross-line of which is represented by the cores 5 and 6, while the transformer 7 constitutes the stem of the T. The cores are identically similar and are of the two-legged type. In each of the cores, the leg adjacent to the crossing-point of the T supports the secondary winding and part of the primary winding, while the other (outer) leg supports the rest of the primary winding. This arrangement is advantageous for electric symmetry reasons and also results in short secondary connections within the unit. The width of the gap $b$ separating the cores 5 and 6 is equal to the width of the gap $a$ between the core 7 and each of the cores 5 and 6. The six rectifier valves 8 and their cooling members 9 are divided into two groups of three, each of which is disposed in one of the rectangular spaces the inner walls of which are constituted by the transformers 5, 7 and 6, 7, respectively, while the outer walls are formed by a rectangular casing (not shown) encasing the entire unit. The rectifier valves are connected (by means not shown) to each other and to the secondaries of the transformers so as to form a six-pulse rectifier bridge.

Figure 3:
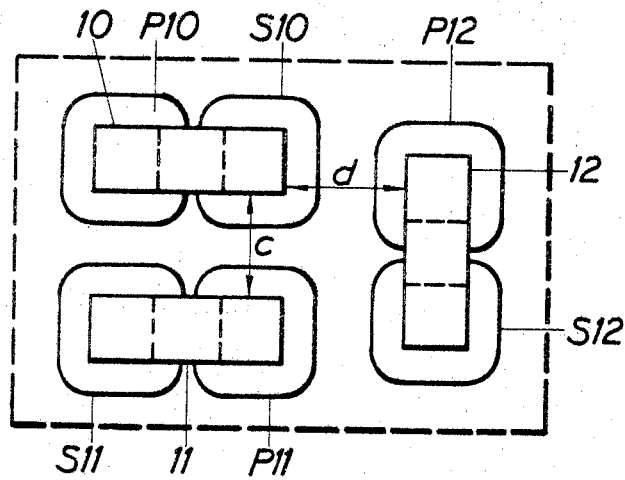
FIG. 3 is a schematic plan view of a transformer unit according to another embodiment of the invention.

In the embodiment schematically illustrated in FIG. 3, the three transformer cores 10, 11, 12 are disposed so as to form a U, two cores 10, 11 being placed beside each other in parallel relation, while the third core 12 is placed at right angles to the cores 10, 11. This is the most compact of the transformer formations possible within the invention. The width of the gap $c$ separating the parallel cores 10, 11 is approximately equal to the width of the gap $d$ separating the core 12 from the cores 10, 11. The transformers 10–12 are similar to the transformers in FIGS. 1–2 in possessing two legs, one of which carries a part P10, P11, P12, respectively, of the primary winding, while the other leg carries the secondary winding S10, S11, S12, respectively, and the rest of the primary winding. It will be noted that the disposition of the windings is such that, at each of the gaps separating the transversal core from the longitudinal cores, one of the transformer legs confining the gap is the leg carrying the secondary winding of the transformer to which it belongs. Otherwise expressed, every other leg in the row of transformer legs present between the extremities of the U carries a secondary winding.

FIG. 4 schematically illustrates the preferred means for adjusting the magnetic leakage and the corresponding stray reactance of the individual transformers. One leg of the transformer core 13 supports the secondary 14 and a first part 15 of the primary. The other leg supports a second part 16 of the primary. The parts 15, 16 are connected in series by a switch 17 cooperating with taps 18, 19 on the parts 15, 16, respectively, in such a way that the ratio of the number of turns of the part 15 connected in circuit to the number of turns of the part 16 connected in circuit can be changed at will without altering the total number of turns connected in circuit.

We claim:
1. A three-phase welding transformer comprising three individual, identically similar, single-phase transformers comprising each a core, a primary winding and a secondary winding, said core having parallel legs and yoke members connecting the legs, said primary and secondary windings being so disposed on said legs as to provide a substantial stray reactance of each of said individual transformers, said welding transformer being particularly distinguished thereby that the three transformer cores are confined between a pair of common, parallel planes extending at right angles to the legs of the cores, the spacing of said parallel planes being equal to the total height of each core in the direction defined by the axes of the legs, the symmetry plane of a first one of said cores, as defined by the axes of the legs of said core, being parallel to the symmetry plane of a second one of said cores and forming right angles with the symmetry plane of the third core, said first and second cores being spaced by substantially the same distance from said third core, said distance being at least approximately equal to the one separating said first and second cores, neither of the distances between any two of the cores exceeding 0.75 times the yoke length of the cores.

2. A welding transformer as claimed in claim 1 which is additionally distinguished thereby that the transformer cores each have two legs, one of which carries the secondary winding and a first part of the primary winding while the other leg carries a second part of the primary winding, and that both of said parts are provided with taps, switching means being provided for selectably engaging said taps for adjustment of the ratio of the number of turns connected in circuit in said first part of the primary winding to the number of turns connected in circuit in said second part of the primary winding.

3. A welding transformer as claimed in claim 1 in which the three individual transformers are arranged in T formation, two aligned transformers forming the cross arm of the T while the third transformer forms the stem of the T.

4. A welding transformer as claimed in claim 2 in which the three individual transformers are arranged in T formation, the secondary winding of each transformer being disposed on the leg adjacent to the other two transformers.

5. A welding transformer as claimed in claim 1 in which the three individual transformers are arranged in U formation.

6. A welding transformer as claimed in claim 2 in which the three individual transformers are arranged in U formation, their relative orientation being such that, at each of the two gaps separating the transversal core from the longitudinal cores, one of the transformer legs adjoining the gap is the leg supporting the secondary winding of the transformer to which it belongs.

7. A welding transformer as claimed in claim 3 including a multiphase full-wave rectifier connected in circuit with the secondary windings of the individual transformers for converting the output thereof to direct current, said rectifier comprising a plurality of rectifier valves and individual heat dissipating members connected to said valves, in which the rectifier valves and their heat dissipating members are subdivided into two equal groups disposed each at one side of the transformer forming the stem of the T.

References Cited

UNITED STATES PATENTS

| 2,068,883 | 1/1937 | Klinkhamer | 315—141 X |
| 2,891,210 | 6/1959 | Mulder | 219—131 X |
| 3,361,951 | 1/1968 | Thorne et al. | 321 |

FOREIGN PATENTS

| 245,038 | 5/1963 | Australia. |
| 505,138 | 8/1951 | Belgium. |

JOHN F. COUCH, Primary Examiner.

W. H. BEHA, JR., Assistant Examiner.

U.S. Cl. X.R.

219—131; 315—141; 336—5